United States Patent
Grubba

[15] 3,640,757
[45] Feb. 8, 1972

[54] FLAME DEPOSITED OXIDE COATING AND METHOD OF MAKING SAME
[72] Inventor: Donald C. Grubba, Westboro, Mass.
[73] Assignee: Avco Corporation, Cincinnati, Ohio
[22] Filed: Aug. 9, 1968
[21] Appl. No.: 751,547

[52] U.S. Cl............................117/93.1 PF, 117/105.2, 117/169
[51] Int. Cl.....................................................B05b 7/22
[58] Field of Search....................117/93.1 PF, 169 R, 169 A, 117/105.2

[56] References Cited

UNITED STATES PATENTS

| | | | |
|---|---|---|---|
| 3,114,826 | 12/1963 | Sullivan et al. | 117/93.1 PF |
| 3,179,784 | 4/1965 | Johnson | 117/93.1 PF |
| 3,219,480 | 11/1965 | Girard | 117/93.1 PF |
| 3,335,025 | 8/1967 | Rightmire et al. | 117/93.1 PF |

FOREIGN PATENTS OR APPLICATIONS

| | | | |
|---|---|---|---|
| 863,190 | 3/1961 | Great Britain | 117/93.1 PF |
| 1,003,118 | 9/1965 | Great Britain | 117/93.1 PF |

OTHER PUBLICATIONS

Davis, "Metal Progress," Vol. 83 No. 3, Mar. 1963, pp. 105-108, 142, 144, 146 and 148.

Primary Examiner—Alfred L. Leavitt
Assistant Examiner—J. H. Newsome
Attorney—Charles M. Hogan and Abraham Ogman

[57] ABSTRACT

Very dense flame spraying deposited coatings containing an unusually high proportion of metal oxides are described and discussed. A preferred method for producing these coatings is described in detail. The coatings are produced by using usually corrosive oxidizing media in contact with the spray deposited particles.

2 Claims, 6 Drawing Figures

*INVENTOR*
DONALD C. GRUBBA
BY ATTORNEYS

FLAME DEPOSITED OXIDE COATING AND METHOD OF MAKING SAME

The invention relates to spray deposited coatings and in particular to spray deposited metal oxide coatings having an unusually high proportion of oxides. In particular, the material to be sprayed is fed to the spray apparatus in an oxidizing medium. The oxidizing environment minimizes the reduction of the oxides while at the same time provides a more efficient environment for the transfer of heat to the materials. The materials being sprayed are heated to higher temperatures producing denser and harder coatings.

Conventionally, spray deposited coatings are provided by softening particles in a high velocity oxyacetylene or inert plasma effluent. In both cases, some of the metal oxide is reduced to lower valence oxides, elemental material and even to metal carbides. The presence of the reduction products in a coating tend to have a deleterious effect on the properties of the coating as compared to the properties of a fully oxidized (group valence) metal oxide coating.

Another problem associated, typically, with flame spray deposited coatings is a low density. That is to say, the coating contains sufficient pores so that its density is somewhat less than 90 percent of a fully dense coating. If coating material is heated to a highly plastic state for high density deposits an excessive amount of reduction is observed. Conventional methodology is a compromise practice as no way was known to reconcile the conflicting effects identified above.

It is an object of the invention to provide a dense oxide coating containing an unusually high proportion of oxides.

It is yet another object of the invention to provide a method for flame spraying oxide materials in which the reduction of oxides is minimized.

It is yet another object of the invention to provide a method of flame spraying oxide coatings in which beneficial use of a normally corrosive and destruction medium is realized.

It is still another object of the invention to provide a method of making a flame spray deposited coating which minimizes the production of reduction products and at the same time results in a high-density deposit.

It is yet another object of the invention to provide a method of making a flame spray deposited coating in which there is a more efficient transfer of heat to the sprayed material.

In accordance with the invention a method of making a flame spray deposited coating comprises providing a high-temperature high-velocity stream of fluid. Next, particles of an oxide coating material are mixed with an oxidizing medium. The mixture is injected into the high temperature normally reducing stream of fluid to prepare the particles for deposition on a substrate. The prepared particles are then directed to a substrate and deposited as a coating.

Also in accordance with the invention a flame spray deposited oxide coating comprises a coating having a density in excess of 90 percent of theoretical density and an oxide content very nearly that of the oxide content of the material sprayed.

The novel features that are considered characteristic of the invention are set forth in the appended claims; the invention itself, however, both as to its organization and method of operation, together with additional objects and advantages thereof, will best be understood from the following description of a specific embodiment when read in conjunction with the accompanying drawings, in which:

Figure 1:
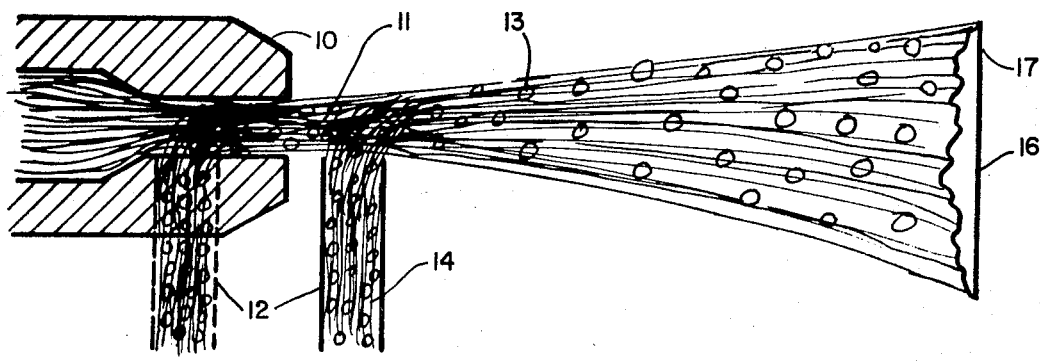
FIG. 1 is a schematic representation of a plasma spray coating apparatus in operation.

Referring to FIG. 1 of the drawings, there is depicted a schematic representation of a form of flame spraying apparatus known as a plasma spraying apparatus. The apparatus includes a plasma generator 10 such as the model PG-100-2 plasma spray gun made by Avco Corporation. The output of a plasma generator is typically a high-temperature high-velocity effluent designated 11. A tube 12 represents a powder feed for supplying coating material to the effluent 11 outside of the plasma apparatus 10. The dotted powder feed 12 is an alternate location of a powder feed for supplying coating material in the nozzle of the plasma apparatus 10.

Typically, the spray coating material is supplied in the form of diminutive powders 13. The powders 13 are carried to the high-velocity effluent 11 by means of a powder carrier gas in a fluidized stream 14.

As seen in FIG. 1, the fluidized powder 13 mixes with the effluent 11 and is carried to a substrate 16 where they are deposited as a coating 17. On mixing with the effluent 11, the powders 13 are raised in temperature and are at least softened and preferably melted so that upon impact with the substrate 16 or coating 17, the softened or melted powders are immediately solidified and adhere to the deposition surface by means of a mechanical and sometimes metallurgical bond.

The temperatures in the effluent 11 as it exits from the equipment 10 is in the neighborhood of 10,000° C. and higher. The effluent 11 is therefore capable of vaporizing the powders 13. The powders 13 do not vaporize because their residence time within the effluent 11 is very short and a great deal of heat absorbed by the powders 13 is reradiated.

If only the surface of the powders 13 is softened, the powders have a tendency of retaining their shape and forming a porous—less than 90 percent dense—deposit. If the entire volume of the powder is softened and preferably melted, the powder 13 on impact with the deposition surface tend to flatten out, flow into depressions in the deposition surface and form grain boundary-type interfaces with the surface materials. In this way, pore generation is minimized and eliminated.

Another advantage to be gained, from added softening of the particles, is an increase in deposition efficiency, i.e., the percentage of powder that adheres to the surface in comparison to the amount of powder sprayed. While always a significant factor, the deposition efficiency is particularly important with costly materials such as chromia and zirconia.

Unfortunately, the optimum is rarely approached through prior art practices probably because of two conflicting conditions. Spraying parameters that tend to provide more heat at a faster rate to the sprayed particles such as added residence time in the effluent 11 and improved heat transfer conditions, also tend to increase the deleterious reduction of the particles as will be now explained.

The object of flame spraying oxides, or any material for that matter, is generally to deposit a coating of the specific oxide composition fed to the spraying apparatus. In the conventional practice, the plasma effluent 11 and the fluid stream 14 are inert gases such as argon, hydrogen and nitrogen. Inert gas plasmas are, in fact, reduction environments in flame spray deposition processes. Fully oxidized metal oxides, in particular, form other oxides at lower valance levels (suboxides) or are reduced to the elemental metal. In general, the properties of the suboxides and the metals cause a deterioration in the properties of the desired coating. Coatings formed in inert gaseous environments are not dense and deposition efficiencies leave much to be desired.

A way was found to overcome the tendency of oxides to be reduced in plasma spraying processes using inert gases and at the same time improve density and deposition efficiency. It is proposed herein to supply an oxidizing medium to the plasma effluent in a region remote from the region in which the plasma effluent is generated. Preferably, the oxidizing medium is supplied downstream of the electric arc in an electric arc plasma generator.

Active gases such as oxygen and air catastrophically shorten the life of plasma apparatus. Oxidizing gases have not been used heretofore and have, in fact, been specifically excluded. In this proposal, the oxidizing medium is supplied to the effluent and away from the heat source; the apparatus' integrity is protected.

In accordance with the invention, the fluid stream 14 comprises an oxidizing medium such as air, oxygen or air and oxygen mixed in any proportions. Pure oxygen is preferred. In an alternative arrangement for creating an oxygen-rich environment, the particles of coating material are blended with an oxidizing agent which when heated by the plasma effluent decomposes and forms an oxygen-rich environment. Such oxidizing materials may be in the form of inorganic peroxides such as potassium permangenate, $Km_nO_4$, sodium peroxide, $Na_2O_2$ and calcium perclorate, $Ca(ClO_4)_2$, and organic peroxides, for example per acetic acid $CH_3CO_3OH$ and benzoyl peroxide $(C_6H_5CO_2)_2$. The particles of coating material are intimately mixed with the oxidizing medium for maximum effectiveness from the viewpoint of heat transfer and lessening reduction.

The process performs most efficiently with multivalence metals such as are particularly found in Group VI and Group IV of the Periodic Table, as these materials form more than one oxide. Included, by way of example, are chromia, zirconia and such complex materials as magnesium zirconate and zirconium silicate, both of which contain zirconia.

On examining the oxidation-reduction equations for these materials in Group VI and Group IV, it can be shown that the presence of an excess of oxygen favors the creation of the oxide having highest valence (group valence) form of the metal. This characteristic is used in an unusual way to minimize the reduction of flame sprayed oxides and to stabilize the content of the deposited coating.

The formation of an oxide is an exothermic reaction. The formation of a higher valence oxide from a lower valence oxide is also exothermic. Conversely, the reduction of an oxide to a lower valance from or to elemental metal is endothermic.

If inert gases are used to supply powders to the plasma effluent, a significant amount of the oxides fed to the plasma effluent end up in the deposited coating as a lower valence oxide or as elemental metal. Lower valence oxides (suboxides), in general are more volatile than the group valence oxides. Volatilization of a suboxide reduces deposition efficiency.

The reduction of the higher valence oxide in the plasma effluent also acts to withdraw from the plasma effluent a significant amount of heat. This is in addition to the amount of heat taken from the plasma effluent to heat up the fluid stream. The aforementioned cooling reduces the temperatures of the plasma effluent enough so that a relatively low-density coating—less than 90 percent of theoretical density—is deposited, probably because the coating particles are not softened sufficiently.

It was mentioned that oxygen enrichment minimizes the occurrence of reduction products in the coating. Two steps are involved. Oxygen enrichment discourages reduction. It also combines with reduction products that are produced, to reform the higher valence oxide. This generally takes place at the deposit surface when the particles are quenched.

Heat is liberated on going from a lower valence to a higher valence oxide. It follows therefore, that on recombination heat is fed into the plasma effluent and the deposit surface. Both are positive factors in raising the temperature of particles being deposited, thus raising the density of the deposit, and the deposition frequency.

Figure 2:
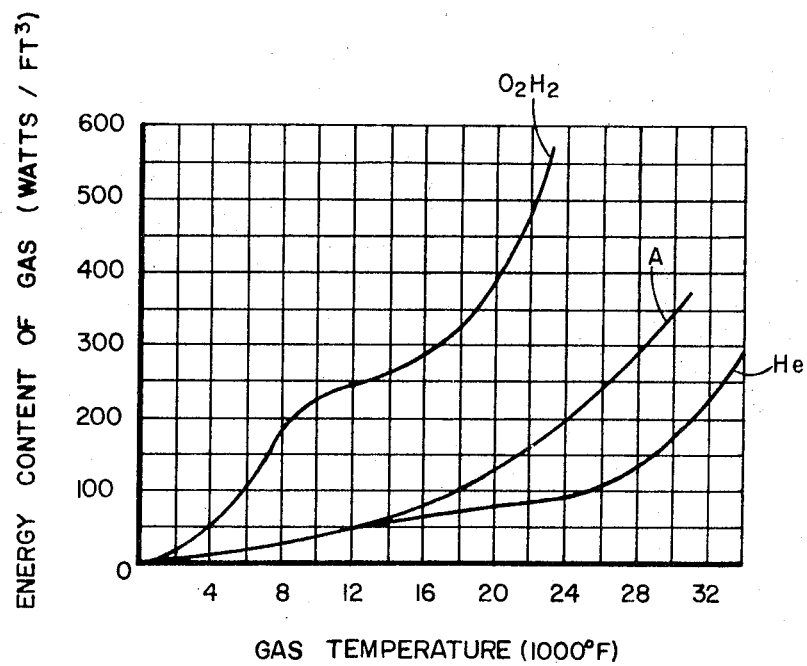
FIG. 2 is a curve useful in explaining the performance of the invention.
Figure 3:
FIG. 3 is a photomicrograph of a cross section of a flame spray deposited chromia coating produced according to prior art methods.
Figure 4:
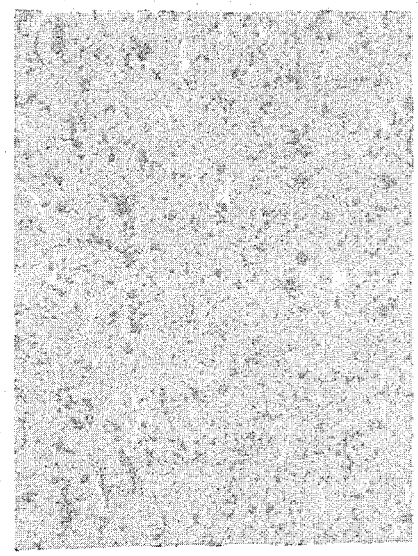
FIG. 4 is a photomicrograph of a cross section of a flame spray deposited chromia coating produced in the manner described herein.
Figure 5:
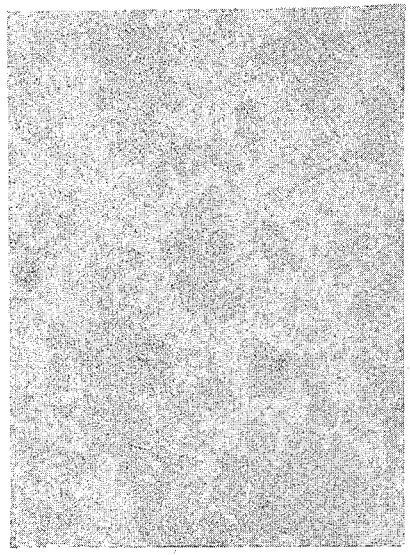
FIG. 5 is a photomicrograph of a cross section of a flame spray deposited zirconia coating produced according to prior art methods.
Figure 6:
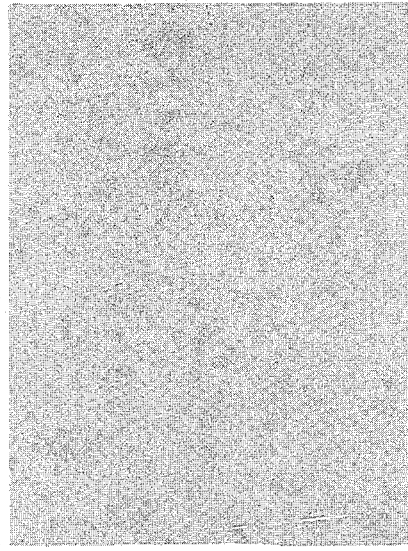
FIG. 6 is a photomicrograph of a cross section of a flame spray deposited zirconia coating produced in the manner described herein.

The use of oxygen also provides a rather unique fringe benefit. Referring briefly to FIG. 2, there are depicted therein three curves showing the heat content of a gas as a function of temperature. The curves designated A for argon and He for helium are representative of monatomic gases. The curve marked $O_2$ and $H_2$ is representative of diatomic gases. It is seen that the heat content of the diatomic gases is very much higher, for a given temperature, than the heat content of the monatomic gases.

Diatomic gases absorb heat very quickly because they must first dissociate before they ionize. All of the heat absorbed by monatomic gases is used to ionize the gas. Of particular interest in this discussion is the experimental observation that diatomic gases also give up their heat at a much faster rate than do monatomic gases.

It is clear, therefore, that the energy taken from the plasma effluent by the diatomic gases are more readily available to the particles being sprayed when the diatomic gases deionize and recombine because the particles are in intimate contact with the diatomic gases. Thus, not only do the particles receive heat in the normal fashion from the plasma effluent, but a more effective heat transfer takes place between a diatomic gas and the particles as the particles traverse the separation between the spraying apparatus and the substrate.

Visual verification of this effect has been achieved in two ways. Particles sprayed in an oxygen-rich environment give a wet, matted appearance when initially deposited on a substrate. In contrast to the development of a bloated porous surface containing blisters and air pockets that are observed with total inert gas procedures, a smooth surface is generated through the use of an oxygen rich environment. The second visual verification arises from the examination of photomicrographs. The coating in FIG. 3 is chromia deposited using inert gas for plasma and for the powder feed gas 14. The coating in FIG. 4 is also chromia and was made under identical conditions as the FIG. 3 coating except for the fact that the powder feed gas was oxygen.

FIG. 5 depicts a zirconia coating made under total inert conditions. FIG. 6 is a zirconia deposit made under identical conditions as the FIG. 5 coating except for the use of oxygen as the powder feed gas. The distinctive difference between these coatings is quite apparent from the photomicrograph. Specifically, attention is directed to the greatly reduced number of pores in the oxygen-enriched coatings of FIGS. 4 and 6. It is also significant that those pores that are present in the oxygen-enriched coating are much smaller than those found in the coating made by standard, inert methods. There are virtually no interconnections between the pores made in an oxygen-rich environment.

Quantitative assessments of the differences have been obtained. The deposition efficiency achieved by oxygen enrichment is 21 percent higher for chromia and 6 percent higher for zirconia. A 4.6 percent increase in density was obtained for chromia and a 15.9 percent increase in density was obtained with zirconia using oxygen enrichment. All of the previous values are typical. The coating made in an oxygen-rich environment is a more faithful reproduction, in composition, of the materials fed to the spray coating apparatus.

The process is not limited to chromia and zirconia. These have been illustrated as they are currently popular coating materials. Any other oxide in the periodic groups mentioned previously will apply.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims:

I claim:

1. A method of making a spray deposited coating comprising:

providing a high-temperature high-velocity stream of chemically reducing fluid;

mixing particles of a coating material with a heat disintegratable oxygen releasing substance;

injecting said mixture into the high-velocity stream of fluid for providing an oxygen-enriched stream of fluid to prepare the particles for deposition on a substrate; and directing the particle laden oxygen-enriched stream of fluid to a substrate for depositing said particles on the substrate as a coating.

2. A method of making a spray deposited coating comprising a high-velocity chemically reducing plasma effluent; fluidizing particles of a metal oxide formed from a metal found in Group VI and IV of the Periodic Table; with a heat disintegratable oxygen-releasing material within a stream of an oxidizing fluid; directing said laden oxidizing fluid into said plasma effluent to produce a particle laden oxygen effluent; and directing the laden oxygen released effluent to a substrate for depositing said particles on the substrate of a coating.

* * * * *